(12) United States Patent
Ball et al.

(10) Patent No.: US 8,511,203 B2
(45) Date of Patent: Aug. 20, 2013

(54) COMPLIANT CAM OF COMPOSITE MATERIALS

(75) Inventors: Donald Ball, Melbourne, FL (US); Christopher Corey, Palm Bay, FL (US); Patrick Waters, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 130 days.

(21) Appl. No.: 13/081,905

(22) Filed: Apr. 7, 2011

(65) Prior Publication Data

US 2012/0255393 A1 Oct. 11, 2012

(51) Int. Cl.
*F16H 53/00* (2006.01)

(52) U.S. Cl.
USPC .......................................................... 74/567

(58) Field of Classification Search
USPC .................. 74/567, 569; 123/90.6; 251/251
See application file for complete search history.

(56) References Cited

U.S. PATENT DOCUMENTS

| | | | |
|---|---|---|---|
| 3,433,091 A | 3/1969 | Jullien-Davin | |
| 3,885,470 A | 5/1975 | Costa et al. | |
| 3,987,688 A | 10/1976 | Tarbet | |
| 4,148,601 A | 4/1979 | Kulabukhov et al. | |
| 4,722,315 A * | 2/1988 | Pickel | 123/568.14 |
| 5,076,782 A | 12/1991 | Campbell et al. | |
| 6,405,995 B1 * | 6/2002 | Spain | 251/129.11 |
| 6,802,287 B2 * | 10/2004 | Battlogg | 123/90.16 |
| 7,322,330 B2 * | 1/2008 | Furchheim | 123/90.6 |
| 7,455,302 B2 | 11/2008 | Young et al. | |
| 2012/0255392 A1 * | 10/2012 | Ball et al. | 74/569 |
| 2012/0255510 A1 * | 10/2012 | Ball et al. | 123/90.49 |

FOREIGN PATENT DOCUMENTS

| | | |
|---|---|---|
| DE | 931141 | 8/1955 |
| DE | 29802343 | 4/1998 |
| JP | 58077556 | 5/1983 |
| JP | 8144717 | 6/1996 |

* cited by examiner

*Primary Examiner* — Vicky Johnson
(74) *Attorney, Agent, or Firm* — Harness, Dickey & Pierce, PLC

(57) ABSTRACT

A compliant cam system includes a cam having a cam body rotatable with respect to a cam rotational axis. The cam body has a cam body center spaced from the cam rotational axis. At least a portion of the cam is an elastically compressible material. A follower having at least one follower surface is in contact with the compressible material portion of the cam. A cam non-deflected condition is defined when an elastically compressible material portion outer surface is in contact with the cam follower surface prior to deflection of the elastically compressible material portion. The cam when thereafter rotated with respect to the cam rotational axis moves the cam body center toward the follower. The elastically compressible material portion deflects, defining a deflected condition, creating a biasing force acting toward the follower, and releasably frictionally engaging the elastically compressible material portion with the follower.

16 Claims, 5 Drawing Sheets

COMPLIANT CAM OF COMPOSITE MATERIALS

FIELD

The present disclosure relates to cam and follower systems used to create an over-center locking position for component retention.

BACKGROUND

Cam and follower designs are known wherein the cam is a solid member which when rotated brings one or more lobes of the cam into contact with the follower to displace a member. Cams can be used to create top-dead center, bottom-dead-center and over-center contact positions and to create locking positions of components and/or fastening designs. Disadvantages of known cam and follower systems are that because the cam is not flexible the component being contacted must either be flexible, or a deflection system must be provided, for example in the form of biasing springs or biasing devices separate from the cam and component that allow the cam lobe displacement to occur in reaching the cam locked position. The disadvantages are further manifested in multiple part systems which increase system cost, increase system complexity and create alignment/tolerancing issues that must be accommodated. Cam, follower and component wear also result from the frictional contact of the cam which requires subsequent adjustment of the cam and/or follower positioning.

SUMMARY

According to several embodiments, a compliant cam system includes a cam having a cam body. The cam is rotatable and in contact with a follower such that rotation of the cam displaces the follower. A portion of the cam is elastically compressible.

According to other embodiments, a compliant cam system includes a cam having a cam body rotatable with respect to a cam rotational axis. The cam body has a cam body center spaced from the cam rotational axis. At least a portion of the cam is an elastically compressible material. A follower having at least one follower surface is in contact with the compressible material portion of the cam. A cam non-deflected condition is defined when an elastically compressible material portion outer surface is in direct contact with the cam follower surface prior to deflection of the elastically compressible material portion. The cam when thereafter rotated with respect to the cam rotational axis moves the cam body center toward the follower. The elastically compressible material portion deflects, defining a deflected condition, creating a biasing force acting toward the follower, and releasably frictionally engaging the elastically compressible material portion with the follower.

According to further embodiments, a compliant cam system includes a cam having a cam body rotatable with respect to a cam rotational axis. The cam body has a cam body center spaced from the cam rotational axis. At least a portion of the cam is an elastically compressible material having an outer surface. A guide member is included, having a follower slidably disposed in the guide member, the follower having a follower surface. A non-deflected condition is defined when the cam body is in direct contact with the follower surface prior to contact between the elastically compressible material portion and the follower surface. The cam when thereafter rotated moves the cam body center between the cam rotational axis and rotates the elastically compressible material portion into direct contact with the follower surface, deflecting the elastically compressible material portion to a deflected condition and thereby creating a biasing force acting toward the follower.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
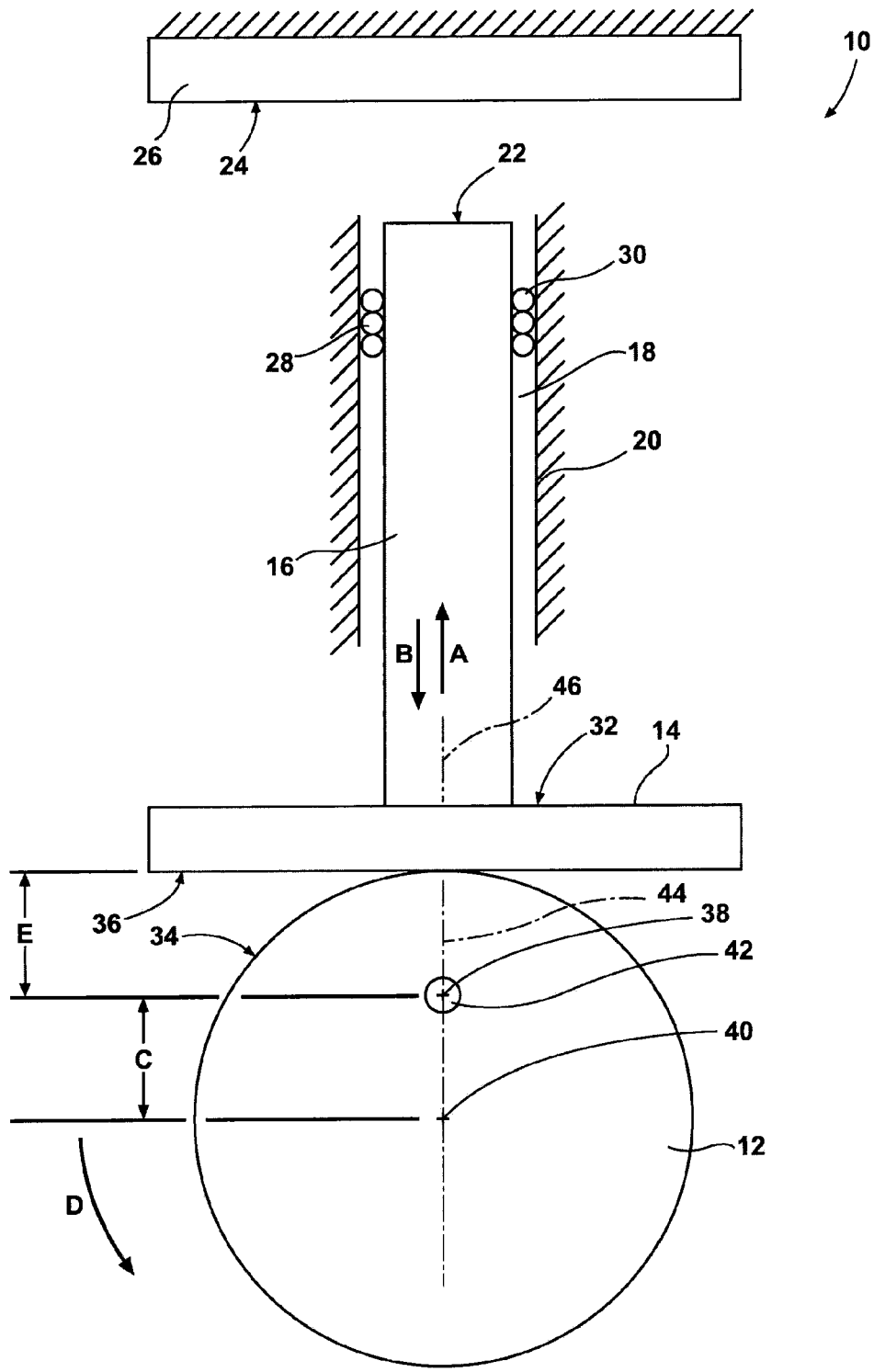
FIG. 1 is a front elevational view of a compliant cam of composite materials of the present disclosure with the compliant cam in a bottom dead center position.

Referring to FIG. 1, a compliant cam system 10 includes a compliant cam 12 in contact with a follower 14 wherein rotation of the compliant cam displaces follower 14. Follower 14 when displaced by compliant cam 12 displaces a follower shaft 16 in either a first direction "A" or an opposite second direction "B" as compliant cam 12 rotates to different positions. Follower shaft 16 can be slidably disposed within a shaft bore 18 of a guide member 20 to control the alignment of follower shaft 16. Starting from a bottom-dead-center position as shown in FIG. 1, subsequent rotation of compliant cam 12 displaces follower 14 and follower shaft 16 in the first direction "A" until a shaft end face 22 contacts a contact face 24 of a fixed member 26. To provide for smooth sliding motion of follower shaft 16 within shaft bore 18, first and second bearing members 28, 30 can be provided.

Follower shaft 16 can be connected to or freely abutting a follower first contact face 32 of follower 14. As compliant cam 12 rotates, a nominal cam body outer surface 34 directly contacts a follower second contact face 36 of follower 14.

Compliant cam 12 is rotatable with respect to a cam rotational axis 38 which is spaced from a cam body center 40 by an offset dimension "C". The cam rotational axis 38 is coaxially aligned in a cam mount aperture 42 which receives a shaft or rotational fastener (not shown) providing the rotational force to rotate compliant cam 12. The bottom-dead-center position or orientation of compliant cam 12 positions cam rotational axis 38 at its closest point of approach to follower second contact face 36 of follower 14, and positions cam body center 40 at its farthest point away from follower 14, with cam rotational axis 38 and cam body center 40 co-axially aligned with respect to a cam displacement axis 44. According to several embodiments, compliant cam 12 is rotated while maintaining cam rotational axis 38 and cam displacement axis 44 co-axially aligned with a bore axial centerline 46 of shaft bore 18, however co-axial alignment with bore axial centerline 46 is not required. Subsequent rotation of compliant cam 12 with respect to cam rotational axis 38, for example in a counter-clockwise cam direction of rotation "D" will rotate cam body center 40 out of alignment with cam displacement axis 44 and toward follower second contact surface 36, thereby displacing follower 14 and follower shaft 16 in the first direction "A". At the bottom-dead-center position shown, a bottom-dead-center spacing "E" is provided between cam rotational axis 38 and follower second contact face 36 of follower 14. Bottom-dead-center spacing "E" is a minimum dimension at the bottom-dead-center position of compliant cam 12. Any rotation of compliant cam 12 away from the bottom-dead-center position results in an increasing dimension between cam rotational axis 38 and follower second contact face 36 as will be described in greater detail in the figures that follow.

A depth or thickness and a geometry in cross section of compliant cams 12 and followers 14 of the present disclosure can vary. Although compliant cams 12 and followers 14 having opposed, substantially planar faces and cam body outer surface 34 and first and second contact surfaces 32, 36 which are substantially perpendicular to the faces can be used, additional geometries can also be used. These include but are not limited to at least one of the faces being curved, non-symmetrical, faceted, or the like. Portions of the cam body outer surface 34 and either or both of first and second contact surfaces 32, 36 can also be angular, irregular or locally raised.

Figure 2:
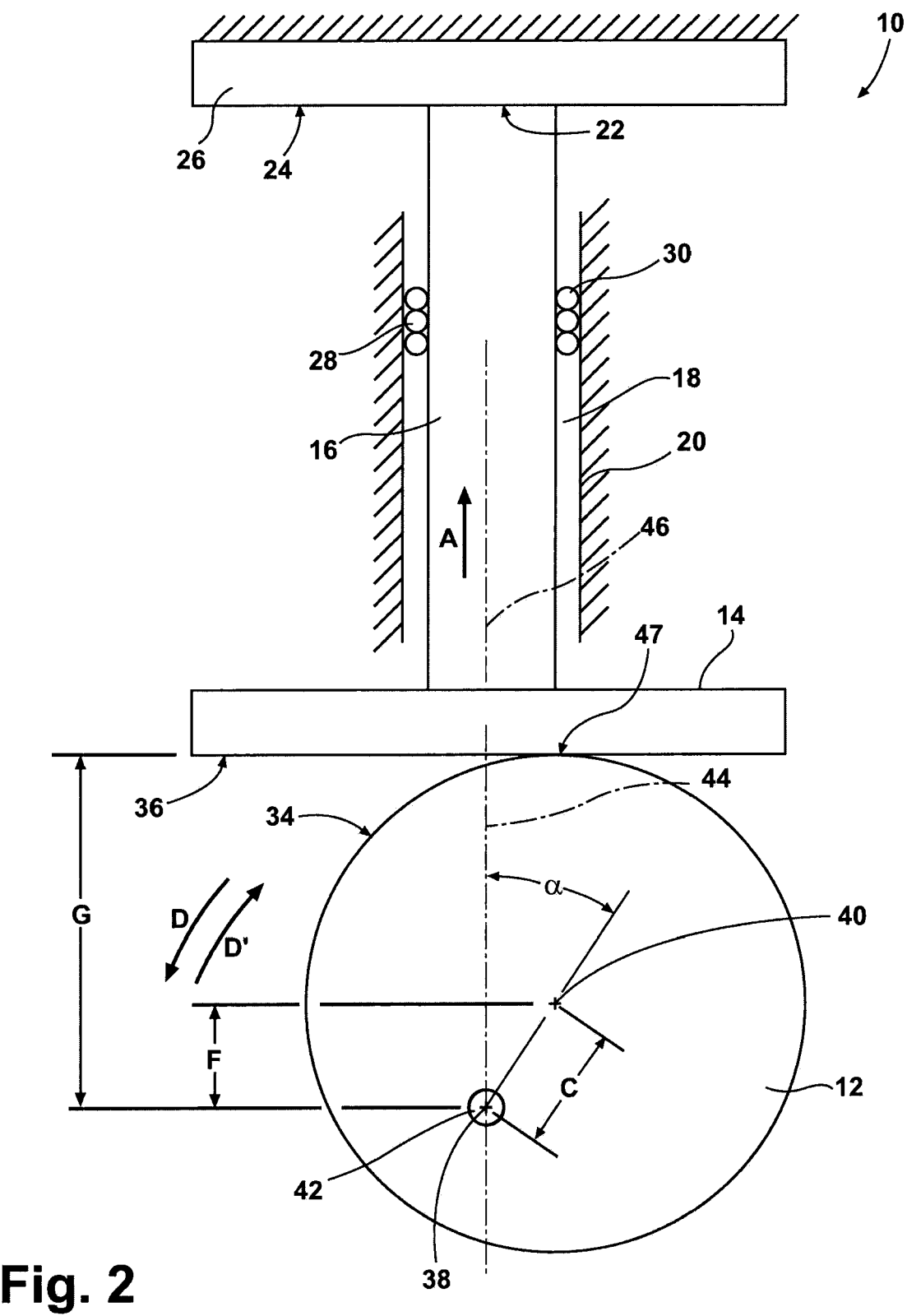
FIG. 2 is a front elevational view of the compliant cam of FIG. 1 with the cam rotated to a workpiece contact, cam non-deflected condition.

Referring to FIG. 2, as previously noted according to several embodiments cam rotational axis 38 is retained at all rotational positions in coaxial alignment with bore axial centerline 46 of shaft bore 18, however coaxial alignment with bore axial centerline 46 is not required for all embodiments of the disclosure. Following rotation of compliant cam 12 in the cam direction of rotation "D" to the position defining the non-deflected condition, shaft end face 22 directly contacts contact face 24 of fixed member 26. Once contact at a contact location 47 is established between shaft end face 22 and contact face 24, further displacement of follower 14 and follower shaft 16 are precluded as these members are substantially incompressible. According to several embodiments, contact location 47 is not in co-axial alignment with cam displacement axis 44 or bore axial centerline 46. When contact location 47 is established, cam body center 40 is angularly displaced with respect to cam displacement axis 44 by an angle α. Because the offset dimension "C" between cam rotational axis 38 and cam body center 40 is substantially fixed, rotation of compliant cam 12 produces a variable effective displacement dimension "F" in the first direction "A" which is determined by calculating the cosine of angle α. At this stage of rotation, the nominal cam body outer surface 34 is retained in its original or nominal shape, which according to several embodiments defines a circle. Also at this stage of rotation, cam rotational axis 38 is positioned at a contact spacing dimension "G" with respect to follower second contact face 36 of follower 14. Contact between shaft end face 22 and contact face 24 will be retained only if compliant cam 12 does not reverse rotate in an opposite direction of rotation "D'" (in a clockwise rotation direction as viewed in FIG. 2).

Referring to FIG. 3 and again to FIG. 2, to resist clockwise rotation of compliant cam 12 and the release of follower shaft 16 from its contact position with fixed member 26, an outer surface of compliant cam 12 is compressed by further compliant cam 12 rotation in the cam direction of rotation "D". Compliant cam 12 is rotated until a top-dead-center position of compliant cam 12 is reached which results in a compression or inward deflection in a cam body outer surface portion 48. This compression can increase a surface area of compliant cam 12 in contact with follower second contact surface 36, thereby indicating releasable frictional engagement between cam body outer surface portion 48 and follower second contact face 36. A frictional force between compliant cam 12 and follower second contact surface 36 is determined by the coefficient of friction between the materials of cam body outer surface portion 48 and follower second contact face 36, and a normal component of the force between cam body outer surface portion 48 and follower second contact face 36.

In the top-dead-center position, a biasing force is generated which acts in the first direction "A" maintaining contact between shaft end face 22 and contact face 24 and frictionally resisting further rotation of compliant cam 12. The top-dead-center position of compliant cam 12 is reached when both cam rotational axis 38 and cam body center 40 are co-axially aligned with cam displacement axis 44 and according to several embodiments also with bore axial centerline 46, having cam body center 40 positioned between cam rotational axis 38 and follower second contact face 36. As previously noted the value of effective displacement dimension "F" varies based on the value of angle α shown and described with reference to FIG. 2. Because offset dimension "C" is greater than effective displacement dimension "F", the value of the inward compression of compliant cam 12 at the top-dead-center position can be expressed as a difference between offset dimension "C" and effective displacement dimension "F" (compression value=C−F).

Also at the top-dead-center position of compliant cam 12, a top-dead-center spacing "H" is created between cam rotational axis 38 and follower second contact face 36. Top-dead-center spacing "H" is substantially equal to contact spacing "G", shown and described with reference to FIG. 2. The geometry of compliant cam 12 changes as a result of the compression at cam body outer surface portion 48. A cam nominal width "J", which is equal to a non-deflected diameter of compliant cam 12, is greater than a cam compressed width "K" where the cam body outer surface portion 48 directly contacts follower second contact face 36. The difference between cam nominal width "J" and cam compressed width "K" (equal to the compression value defined above) can be varied. According to several embodiments, the difference between cam nominal width "J" and cam compressed width "K" can range between approximately 0.076 cm and 0.102 cm (0.030 to 0.040 in). The compressible material provided at cam body outer surface portion 48 is elastically compressible, therefore when compliant cam 12 is rotated in the opposite cam direction of rotation "D'" the material at cam body outer surface portion 48 returns to the non-compressed condition. Further rotation in the cam direction of rotation "D'" after reaching the non-compressed condition also permits follower 14 and follower shaft 16 to return in the second direction "B".

Figure 3:
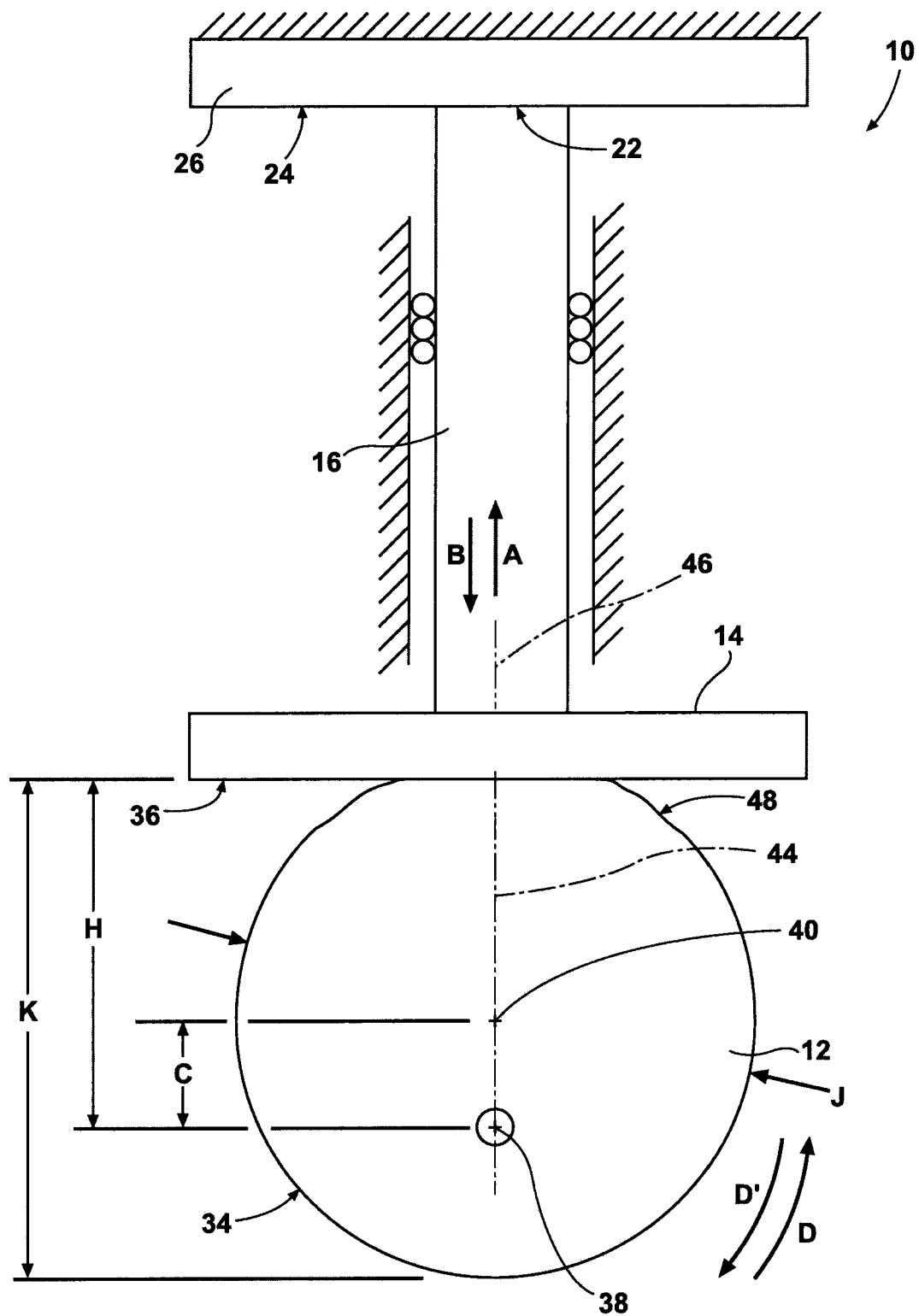
FIG. 3 is a front elevational view of the compliant cam of FIG. 1 with the cam in a top dead center, cam deflected condition.

Referring to FIG. 4 and again to FIGS. 1-3, according to several embodiments, a compliant cam 50 is modified from compliant cam 12 to include a cam body 52 of a first substantially incompressible material, such as a metal or polymeric material. Compliant cam 50 includes a cam body center 54 and a cam rotational axis 56. Compliant cam 50 is rotatable with respect to a cam rotational axis 56. A cam mount aperture 58 is coaxially aligned with cam rotational axis 56 to act as the center of rotation for cam body 52. A bottom-dead-center position of compliant cam 50 is provided when cam body center 54 is co-axially aligned together with cam rotational axis 56 with respect to a cam displacement axis 60, having the cam body center 54 positioned directly below cam rotational axis 56 and between a compliant layer 62 and cam rotational axis 56. A material having elastic deflection properties is provided as compliant layer 62. Compliant layer 62 is fixed to cam body 52 such as by adhesive bonding, thermal bonding, or other fixing process such that compliant layer 62 extends between a first compliant layer end 64, at least partially about a perimeter of compliant cam 50, to a second compliant layer end 66.

According to several embodiments, a thickness at first and second compliant layer ends 64, 66 is gradually reduced to substantially zero. Compliant layer 62 is fixed or attached to a perimeter wall 68 of cam body 52 such that the geometry of compliant cam 50 can vary. These include having the shape of perimeter wall 68 defining a geometric shape, such as a circle, including the material of compliant layer 62. According to other embodiments, cam body 52 defines the geometric shape, such as a circle, and the material of compliant layer 62' is added onto (extends away from) the perimeter wall 68. A thickness of compliant layer 62 can be a maximum at its intersection with cam displacement axis 60, thereby defining a maximum thickness "L" between a compliant layer outer surface 70 and a cam body outer surface 72 at the junction between compliant layer 62 and cam displacement axis 60.

According to other embodiments, the location of maximum thickness "L" can vary from the position of intersection with cam displacement axis 60. When a compliant layer 62' is provided, a compliant layer outer surface 70' is defined. Perimeter wall 68 can define a body nominal diameter "M", which according to several embodiments is a circular shape. Other shapes (i.e., oval or ob-round) can also be created, for example when compliant layer 62' is provided as an add-on or additional layer such as compliant layer outer surface 70'.

Figure 4:
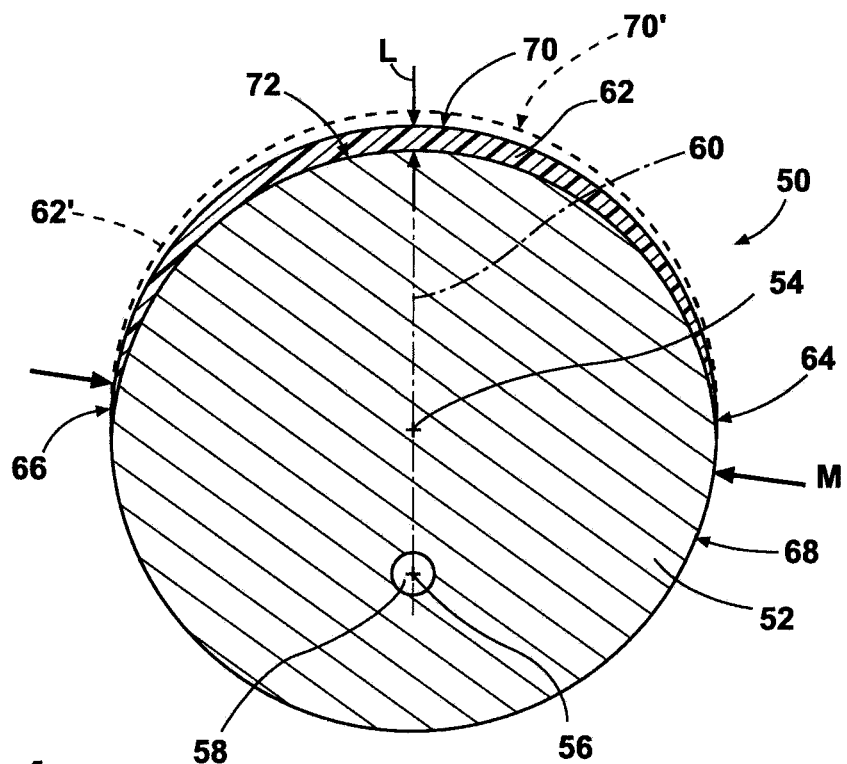
FIG. 4 is a front elevational cross sectional view of the compliant cam of FIG. 1.

Referring to FIG. 5 and again to FIG. 4, a compliant cam 74 is modified from compliant cam 50 to provide a continuously increasing thickness, partial outer layer of compressible material to a specific angular location, and thereafter reducing the thickness of this layer. A cam body 76 of compliant cam 74 is similar to cam body 52 including a cam body center 78, a cam rotational axis 80, and a cam mount aperture 82, which according to several embodiments are co-aligned on a cam displacement axis 84. A compliant layer 86 of an elastically compressible material is fixed to cam body 76 starting at a first compliant layer end 88 and extending in a continuously increasing thickness to a second compliant layer end 90.

According to several embodiments of compliant cam 74, a compliant layer outer surface 92 is separated from a cam body outer surface 94, defining a maximum thickness "N" coinciding with the location of cam displacement axis 84. A thickness of compliant layer 86 thereafter decreases between maximum thickness "N" and the second compliant layer end 90. Compliant cam 74 therefore provides a top-dead-center position where contact is made with a follower (not shown) at the location of maximum thickness "N". By further rotating compliant cam 74 until follower contact is made proximate to the second compliant layer end 90, an over-center or locking position of compliant cam 74 is created. According to several embodiments, a cam perimeter wall 96 can include the compliant layer outer surface 92, thereby defining a substantially circular shape for compliant cam 74.

According to other embodiments, a compliant layer 86' can be applied onto a circular shaped cam perimeter wall 96, thereby creating a non-circular shape for the combination of compliant layer 86' and cam perimeter wall 96. Compliant layer 86 can be reduced in thickness to substantially zero at the first compliant layer end 88 and successively increase in thickness about the cam body outer surface 94 until the maximum thickness "N" is achieved. This changing thickness of compliant layer 86 results in a continuously decreasing effective stiffness of compliant cam 74 as compliant cam 74 rotates. According to further embodiments, the orientation of compliant layer 86 can be reversed, having the maximum thickness "N" provided proximate to the first compliant layer end 88 and the minimum or substantially zero thickness provided proximate to second compliant layer end 90. This configuration of the compliant layer thickness for compliant layer 86 results in a continuously increasing effective stiffness of compliant cam 74 as compliant cam 74 rotates.

Figure 5:
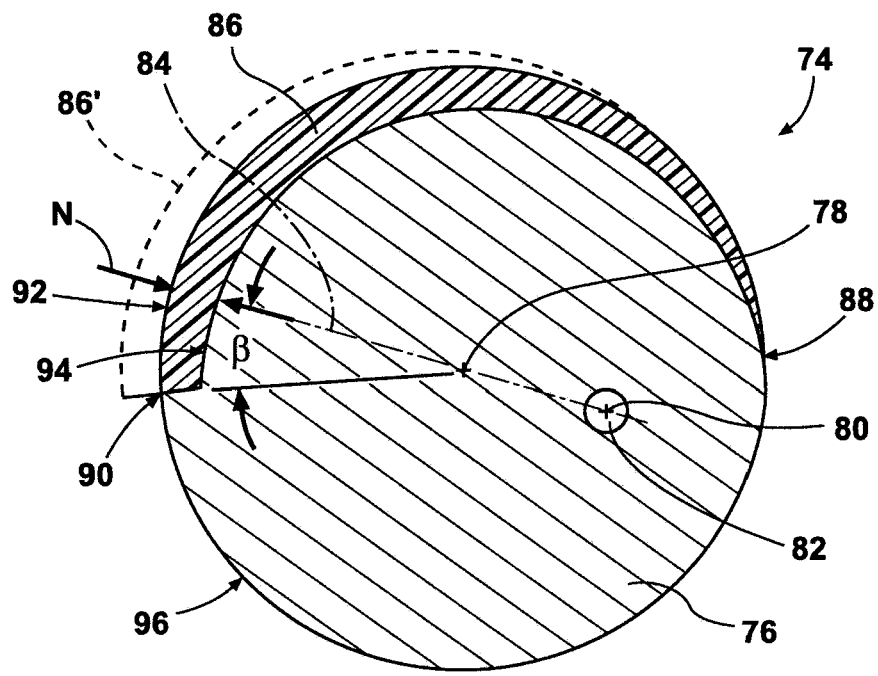
FIG. 5 is a front elevational cross sectional view of another embodiment of a compliant cam of the present disclosure.
Figure 6:
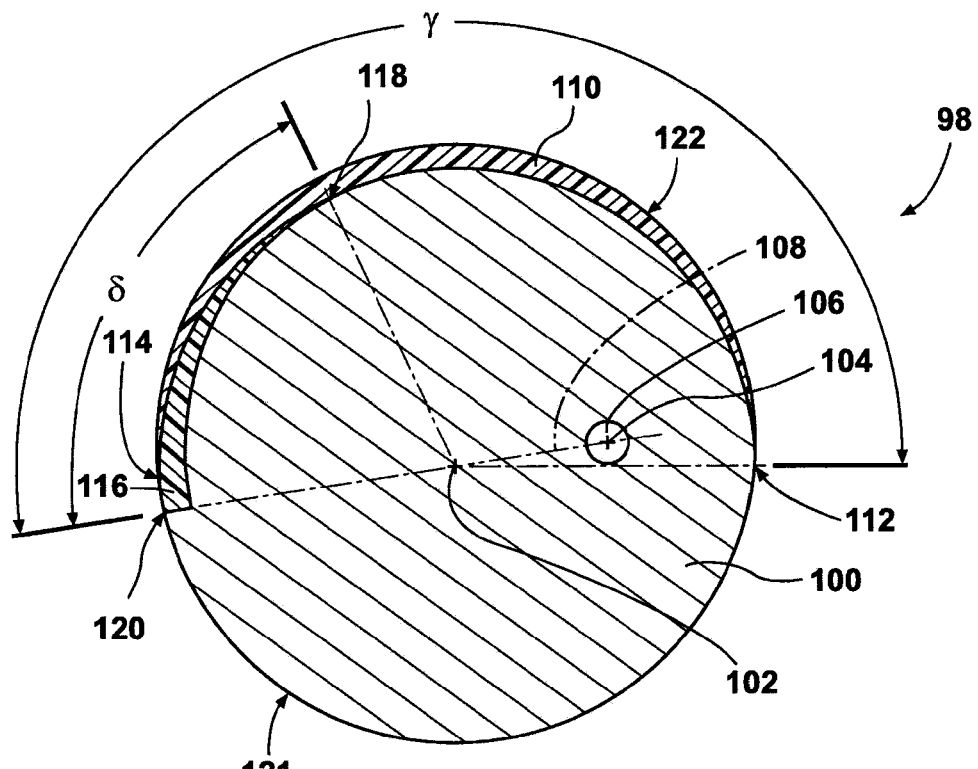
FIG. 6 is a front elevational cross sectional view of another embodiment of a compliant cam of the present disclosure.

Referring to FIG. 6 and again to FIGS. 1 and 4-5, a compliant cam 98 is further modified from the previously described compliant cams 12, 50 and 74 to include at least two different compressible material compliant layers. The compliant layers can have different stiffness values to provide for different values of compression against a follower (not shown) where the follower contacts the outer surface of the compliant layers. For example, a cam body 100 can be provided having a cam body center 102, a cam rotational axis 104, a cam mount aperture 106, and a cam displacement axis 108 similar to those previously described. A first compliant layer 110 is provided starting at a first compliant layer first end 112 and extending about a partial perimeter of cam body 100 to a first compliant layer second end 114. A second compliant layer 116 can be provided having the same or less than the same amount of angular rotation with respect to cam body 100 compared to first compliant layer 110. For example, second compliant layer 116 can extend from a second compliant layer first end 118 to a second compliant layer second end 120.

The total extent or surface area about the perimeter of cam body 100 that is covered by either or both the first and second compliant layers 110, 116 corresponds to an angle γ, which according to several embodiments is greater than 180 degrees, but can range anywhere from approximately 45 degrees to greater than 200 degrees. An angle δ represents the extent or surface area about the perimeter of cam body 100 where second compliant layer 116 is provided. According to several embodiments, angle δ is less than angle γ and can be, for example, approximately 45 to 60 degrees. The first and second compliant layers 110, 116 can overlap each other for a portion of the range defined by angle δ, having first compliant layer 110 successively decreasing in thickness as a thickness of second compliant layer 116 successively increases.

This use of at least first and second compliant layers permits the amount of biasing force provided by compliant cam 98 to be tuned or modified by changing the location and thickness of either or both of the first and second compliant layers 110, 116 and the stiffness of each. Similar to the compliant cams previously described herein, a cam perimeter wall 121 can define a geometric shape, such as a circle (shown), which includes the material of the first and second compliant layers 110, 116. In other embodiments the first and/or second compliant layers 110, 116 can extend away from the geometry defined by cam perimeter wall 121 such that a compliant layer outer surface 122 can define an extension of cam perimeter wall 121 directed away from or radially beyond cam perimeter wall 121.

Figure 7:
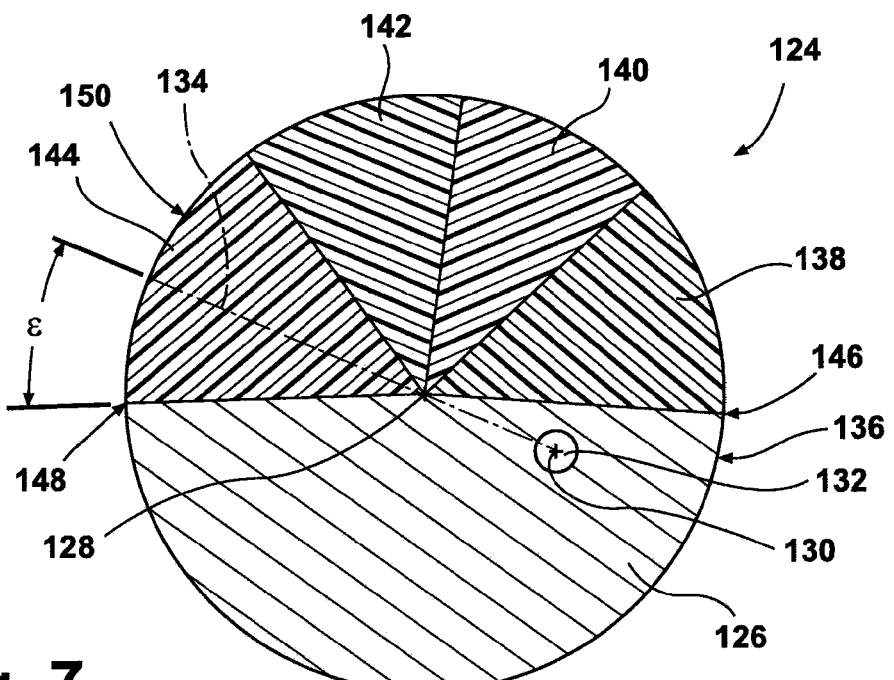
FIG. 7 is a front elevational cross sectional view of another embodiment of a compliant cam of the present disclosure.

Referring to FIG. 7, additional embodiments for compliant cams of the present disclosure can further include a compliant cam 124. Similar to the previous compliant cams described herein, compliant cam 124 can include a compressible or a substantially incompressible cam body 126 having a cam body center 128, a cam rotational axis 130, a cam mount aperture 132, and a cam displacement axis 134. Compliant cam 124 differs from the previous compliant cams described herein in that compliant cam 124 provides multiple pie-shaped compressible material sections that can be made of the same or differing elastically compressible compliant materials such that each of the compressible sections will compress to a greater or lesser degree than the successive ones of the compliant sections, thereby providing a different biasing force as each compliant section is contacted and compressed.

According to several embodiments, a cam perimeter wall 136 defines a geometric shape, such as a circle. Compliant cam 124 includes each of a first, second, third, and fourth compliant section 138, 140, 142, 144. As previously noted, the first, second, third, and fourth compliant sections 138, 140, 142, 144 can be pie-shaped and can be formed in either substantially equal areas or volumes, or can differ in area or volume from each other. The elastically compressible material of the compliant sections begins at a compliant section first end 146 and extends to a compliant section second end 148. As with previous designs of compliant cams of the present disclosure, the degree of rotation between compliant section first and second ends 146, 148 can vary from approximately 45 degrees to approximately 200 degrees or more.

According to several embodiments, compliant section second end 148 is oriented at an angle $\epsilon$ with respect to cam displacement axis 134 such that the fourth compliant section 144 can define either a maximum or a minimum stiffness value with respect to the other compliant sections. Similar to the previous designs of compliant cams of the present disclosure, compliant cam 124 can also have a compliant section outer surface 150 that can be coextensive with cam perimeter wall 136 or, that can be an independent geometry extending further away from the shape defined by cam perimeter wall 136.

Compliant cams of the present disclosure offer several advantages. By making the entire body of the compliant cam from an elastically compressible material, or from the use of an elastically compressible material provided about a specific perimeter portion of the compliant cams of the present disclosure, the compliant cam can deflect as the compliant cam rotates in contact with a follower, thereby allowing the compliant cam to create a biasing force without the need for additional springs or other deflectable members commonly used in known cam operating systems. The specific location and geometry of the compliant cam elastically compressible material can be varied to tune the compliant cam for specific operations. The stiffness and/or value of deflection provided by the compliant materials of the compliant layers can also be varied to change the amount of biasing force created as the compliant cam rotates. One, two, or more areas of compliant layer material can be provided for compliant cams of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compliant cam system, comprising:
a cam having a cam body, the cam being rotatable about a cam rotational axis and in contact with a follower such that rotation of the cam displaces the follower along a displacement axis; and
a portion of the cam being elastically compressible, where the portion of the cam includes a first compliant layer overlapped in an area with a second compliant layer, the first compliant layer comprised of a material having different stiffness than the material comprising the second compliant layer and the first compliant layer successively decreasing in thickness in the overlapped area as the second compliant layer successively increasing so that the overlapped area has a uniform thickness.

2. The compliant cam system of claim 1, wherein the cam body is substantially incompressible and the portion of the cam is an elastically compressible material fixed to the cam body and having a surface portion coextending with respect to an outer surface of the cam body in a non-deflected condition of the portion.

3. The compliant cam system of claim 2, wherein both the surface portion and the outer surface together define a circular shape.

4. The compliant cam system of claim 1, wherein the cam body is substantially incompressible and the portion of the cam is an elastically compressible material fixed to the cam body and having a surface portion spaced outwardly away from an outer surface of the cam body in a non-deflected condition of the portion.

5. The compliant cam system of claim 4, wherein the outer surface of the cam body defines a circular shape.

6. The compliant cam system of claim 1, wherein the elastically compressible portion of the cam extends for an angle from a first end to a second end having a maximum thickness between the first and second ends.

7. The compliant cam system of claim 6, wherein a top-dead-center position of the cam is defined when a cam body center and a cam rotational axis spaced from the cam body center are aligned along the displacement axis, having the cam body center positioned above the cam rotational axis and between the cam rotational axis and the elastically compressible portion maximum thickness.

8. A compliant cam system, comprising:
a cam including:
a cam body rotatable with respect to a cam rotational axis, and having a cam body center spaced from the cam rotational axis; and
at least a portion of the cam being an elastically compressible material, where the portion of the cam includes a first compliant layer and a second compliant layer, the first compliant layer comprised of a material having different stiffness than the material comprising the second compliant layer, wherein a thickness of the elastically compressible portion continuously increases from the first end to a maximum thickness; and
a follower having at least one follower surface in contact with the compressible material portion of the cam; the cam is rotated about the cam rotational axis such that the follower is displaced by the cam along a displacement axis.

9. The compliant cam system of claim 8, wherein the elastically compressible portion of the cam extends for an angle from a first end to a second end having a maximum thickness between the first and second ends.

10. The compliant cam system of claim 9, wherein a top-dead-center position of the cam is defined when the cam body center and the cam rotational axis are aligned along the displacement axis such that the cam body center positioned between the cam rotational axis and the elastically compressible portion maximum thickness, with the elastically compressible portion maximum thickness in releasable frictional engagement with the follower.

11. The compliant cam system of claim 8, wherein in a non-deflected condition the outer surface of the elastically compressible material portion is in contact with the cam follower surface at a contact location which is not in co-axial alignment with the cam displacement axis or the bore axial centerline.

12. The compliant cam system of claim 8, wherein the cam when rotated with respect to the cam rotational axis acts to move the cam body center toward the follower thereby deflecting the elastically compressible material portion defining a deflected condition and creating a biasing force acting toward the follower, and releasably frictionally engaging the elastically compressible material portion with the follower.

13. A compliant cam system, comprising:
a cam, including:
a cam body rotatable with respect to a cam rotational axis, the cam body having a cam body center spaced from the cam rotational axis; and
at least a portion of the cam being an elastically compressible material having an outer surface, where the portion of the cam includes a first compliant layer and a second compliant layer, the first compliant layer comprised of a material having different stiffness than the material comprising the second compliant layer;
a guide member;
a follower slidably disposed in the guide member, the follower having a follower surface; and
a non-deflected condition defined when the cam body is in direct contact with the follower surface prior to contact between the elastically compressible material portion and the follower surface, the cam when thereafter rotated moving the cam body center between the cam rotational axis and the follower, rotating the elastically compressible material portion into contact with the follower surface, elastically deflecting the elastically compressible material portion to a deflected condition and thereby creating a biasing force acting toward the follower.

14. The compliant cam system of claim 13, wherein the guide member is in direct contact with an incompressible, fixed member in the non-deflected condition.

15. The compliant cam system of claim 14, further including a shaft of the follower, wherein direct contact is maintained between the shaft of the follower and the fixed member by the biasing force in the deflected condition.

16. The compliant cam system of claim 13, further including a bearing member aligning the follower in a bore of the guide member.

* * * * *